(12) United States Patent
Deng

(10) Patent No.: US 12,408,677 B1
(45) Date of Patent: Sep. 9, 2025

(54) PORTABLE SMOKE INJECTION DEVICE

(71) Applicant: Shenzhen Duoyu Technology Co., Ltd., Guangdong (CN)

(72) Inventor: Shangding Deng, Guangdong (CN)

(*) Notice: Subject to any disclaimer, the term of this patent is extended or adjusted under 35 U.S.C. 154(b) by 0 days.

(21) Appl. No.: 19/175,435

(22) Filed: Apr. 10, 2025

(30) Foreign Application Priority Data

Mar. 29, 2025 (CN) .......................... 202510398290.8

(51) Int. Cl.
*A23B 4/052* (2006.01)
*A23B 4/044* (2006.01)

(52) U.S. Cl.
CPC .............. *A23B 4/052* (2013.01); *A23B 4/044* (2013.01)

(58) Field of Classification Search
CPC ........ A23B 4/052; A23B 4/0523; A23B 4/044
USPC .......................................................... 99/482
See application file for complete search history.

(56) References Cited

U.S. PATENT DOCUMENTS

| | | | |
|---|---|---|---|
| 11,744,256 B2 * | 9/2023 | Sumner | A23B 4/052 426/314 |
| 12,127,565 B1 * | 10/2024 | Qu | C12G 3/07 |
| 2020/0221718 A1 * | 7/2020 | Flood | C12G 3/07 |
| 2022/0361543 A1 * | 11/2022 | Middleton | A23L 27/27 |
| 2023/0301315 A1 * | 9/2023 | Guan | A23B 4/052 |

* cited by examiner

*Primary Examiner* — Reginald Alexander

(57) ABSTRACT

The present application offers a portable smoke injection device that includes several key components: a main body housing a control circuit board, an ignition module for igniting the material to be burned, and a gas delivery module for outputting smoke from the device. At one end of the main body is a smoke outlet for releasing the smoke. The device features an air inlet and a combustion chamber inside the main body, designed to hold the material being burned. The smoke outlet is positioned outside the combustion chamber, while the ignition module is located close to or extends into the combustion chamber to ignite the material. Furthermore, the device includes a control button or control panel on the outside of the main body to operate the ignition and gas delivery modules. The ignition module, gas delivery module, and control button are all electrically connected to the control circuit board.

8 Claims, 5 Drawing Sheets

PORTABLE SMOKE INJECTION DEVICE

FIELD OF THE APPLICATION

The application relates to the technical field of smoke injection products, and in particular to a portable smoke injection device that is easy to operate and has high safety.

BACKGROUND

When mixing whiskey, cocktails, and other drinks, adding a smoke flavor can enhance the taste and aroma significantly.

Traditional smoking methods typically involve using an external fire source to ignite combustible materials and rely on natural airflow or manual intervention to direct the smoke into a bottle or glass. However, current household smoking equipment has several major drawbacks:
- A. Complicated Operation: Users must manually ignite the material and guide the smoke into the container, which can be inconvenient.
- B. Poor Smoke Control: The generation and diffusion of smoke often depend on natural conditions or manual operation, making it difficult to achieve consistent smoke flavor every time.
- C. Safety Risks: Using open flames poses a fire hazard when igniting materials.
- D. Unstable Effects: The quality of the smoking effect is heavily influenced by the user's skills, making it hard to achieve a consistently ideal outcome.

For instance, the technical document with U.S. Pat. No. 11,871,769B2 describes a smoke generator that includes a handheld lighter and a combustion chamber, which produces smoke by burning wood chips. However, this method faces issues such as cumbersome operation, poor smoke control, safety risks, and an unstable effect.

Finding technical improvements to address these shortcomings and enhancing ease of use and smoke control capabilities is a common consideration among technicians in this field.

SUMMARY

The issues present in the prior art that this application addresses are as follows:
- A. Complicated Operation: The process requires manual ignition and manual guidance of smoke into the container, which is inconvenient.
- B. Poor Smoke Control: The generation and diffusion of smoke depend on natural conditions or manual intervention, making it challenging to maintain consistent smoke flavor each time.
- C. Safety Risks: Using open flames to ignite materials poses a fire hazard.
- D. Unstable Effect: The smoke effect is heavily influenced by the user's operating skills, making it difficult to achieve a consistent and ideal result.

The solution to the technical problem of the present application is:

Provide a portable smoke injection device, including a main body, a control circuit board arranged inside the main body, an ignition module for igniting the object to be burned, and a gas delivery module for outputting smoke from the main body;

A smoke outlet for outputting smoke is provided at one end of the main body; an air inlet is provided on the main body; a combustion chamber is provided inside the main body for placing the object to be burned; the smoke outlet is provided outside the combustion chamber; the ignition module is close to or extends into the combustion chamber to ignite the object to be burned.

It also includes a control button or control panel arranged on the outside of the main body for controlling the operation of the ignition module and the gas delivery module; the ignition module, the gas delivery module, and the control button are electrically connected to the control circuit board.

Preferably, the main body includes a bottom cover and an upper cover matched with the bottom cover; the smoke outlet is opened on the bottom cover; and the air inlet is opened on the upper cover.

A ceramic heat insulation member is preferably included inside the main body for enhanced thermal insulation, and it is shaped to fit the combustion chamber.

The ignition module ideally consists of an arc high-voltage package, which utilizes high-voltage discharge to ignite the material being burned. The discharge component of this arc high-voltage package extends into the ceramic heat insulation member.

Additionally, the ceramic heat insulation member features multiple holes for efficient conduction on the side facing the combustion chamber.

The gas delivery module can be either a fan or an air pump. Inside the main body, there should also be a mounting panel designed to secure the control circuit board and the fan. Furthermore, a power supply component and an external charging port are included inside the main body.

The middle section of the bottom cover is designed to be recessed inward, forming the combustion chamber, with smoke outlets positioned around the perimeter of this chamber. For structural integrity, the combustion chamber is preferably made from a ceramic-coated metal material.

Air inlets are arranged around the front of the main body, and the control button or control panel is centrally located within this area.

The technical effects of the technical problems solved by the present application are as follows:

Compared with the prior art, the portable smoke injection device of the present application is provided with a main body, a control circuit board 18 arranged inside the main body, an ignition module for igniting the object to be burned, and a gas delivery module for outputting smoke from the main body; a smoke outlet 122 for outputting smoke is provided at one end of the main body; an air inlet 112 is provided on the main body; a combustion chamber is provided inside the main body for placing the object to be burned; the smoke outlet 122 is provided outside the combustion chamber; the ignition module is close to or extends into the inside of the combustion chamber for igniting the object to be burned; a control button or control panel 111 is provided outside the main body for controlling the operation of the ignition module and the gas delivery module; the ignition module, the gas delivery module, and the control button are electrically connected to the control circuit board 18, and the combustibles are efficiently ignited by using related technologies such as arc high-voltage ignition, and the smoke is diffused by a fan to enter the wine glass, thereby giving the drink a unique smoky flavor.

BRIEF DESCRIPTION OF THE DRAWINGS

As shown in FIGS. 1-5:
Upper cover 11;
Control panel 111;
Air inlet 112;
Charging port 113;
Bottom cover 12;
Inner recess 121;
Smoke outlet 122;
Ceramic insulation 13;
Hole 131;
Upper component insulation sheet 14;
Installation panel 15;
Arc high-voltage package 16;
Discharge part 161;
Fixed plastic part 162;
Electrode insulation ceramic part 163;
Fan 17;
Control circuit board 18;
Power supply assembly 19

While the technology is susceptible to various modifications and alternative forms, specifics thereof have been shown by way of example and drawings, and will be described in detail. It should be understood, however, that the application is not limited to the particular embodiments described. On the contrary, the application is to cover modifications, equivalents, and alternatives falling within the spirit and scope of the technology.

DETAILED DESCRIPTION OF EMBODIMENTS

The embodiments of the present technology described herein are not intended to be exhaustive or to limit the technology to the precise forms disclosed in the following detailed description. Rather, the embodiments are chosen and described so that others skilled in the art can appreciate and understand the principles and practices of the present technology.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

Figure 1:
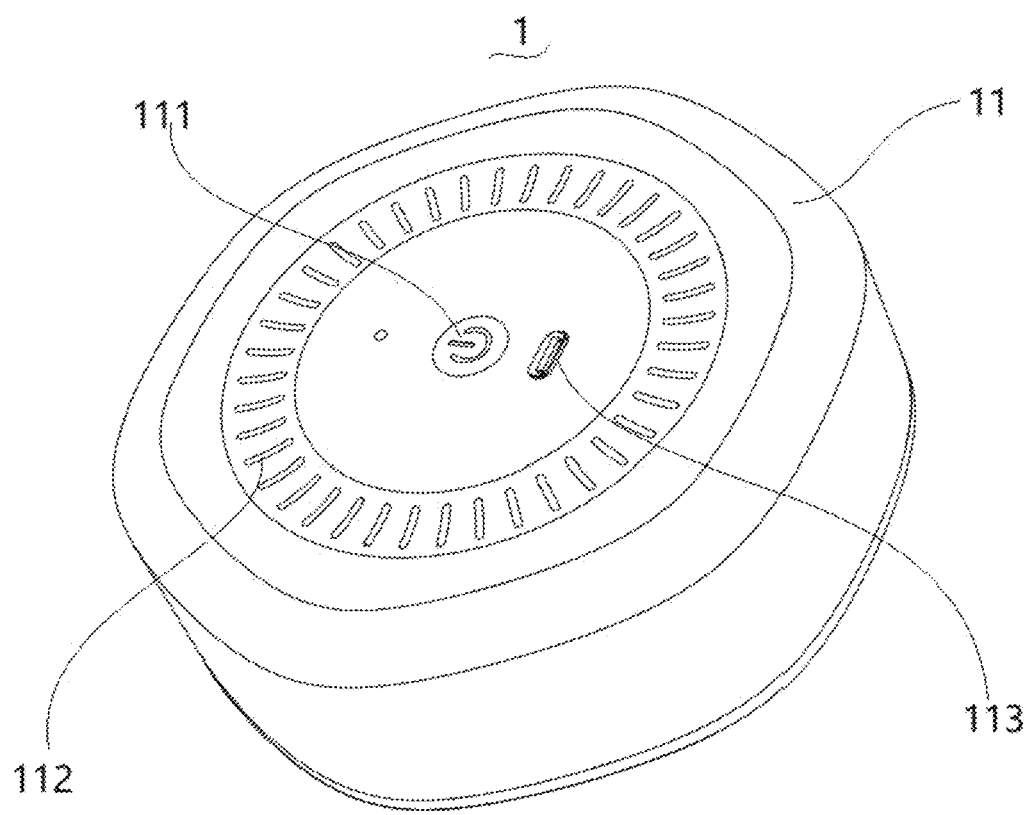
FIG. 1 is a schematic diagram of the three-dimensional structure of a portable smoke injection device of the present application.
Figure 2:
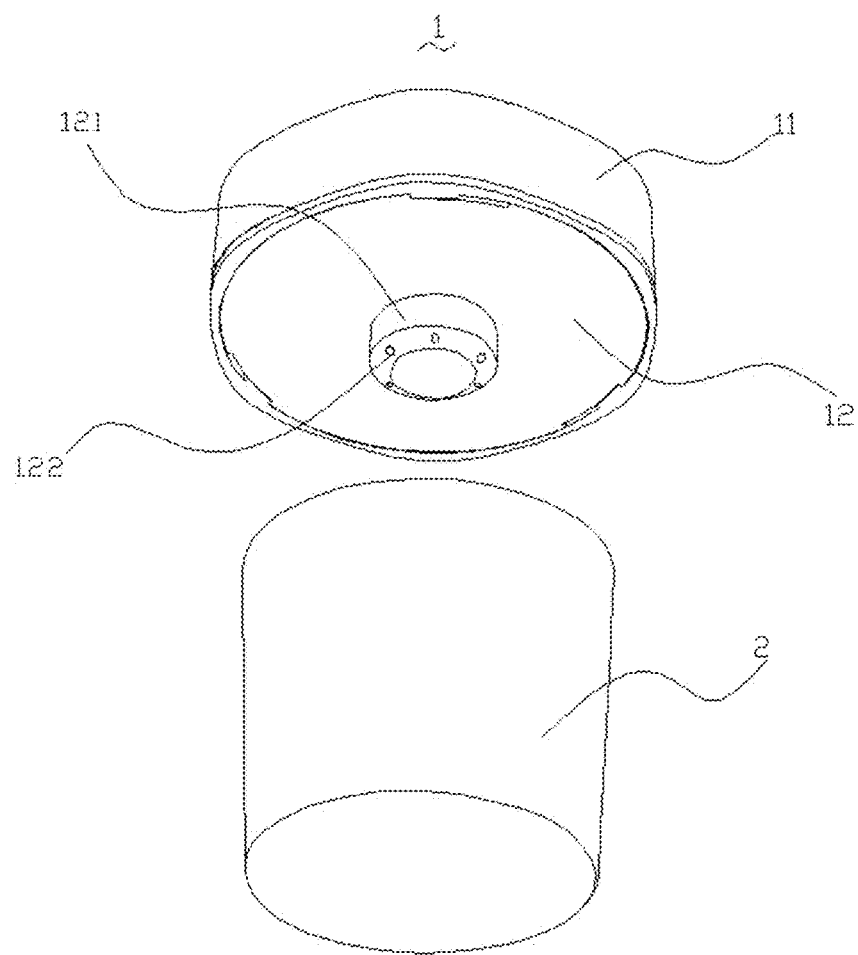
FIGS. 2 and 4 are schematic diagrams of the application structure of a portable smoke injection device of the present application.
Figure 3:
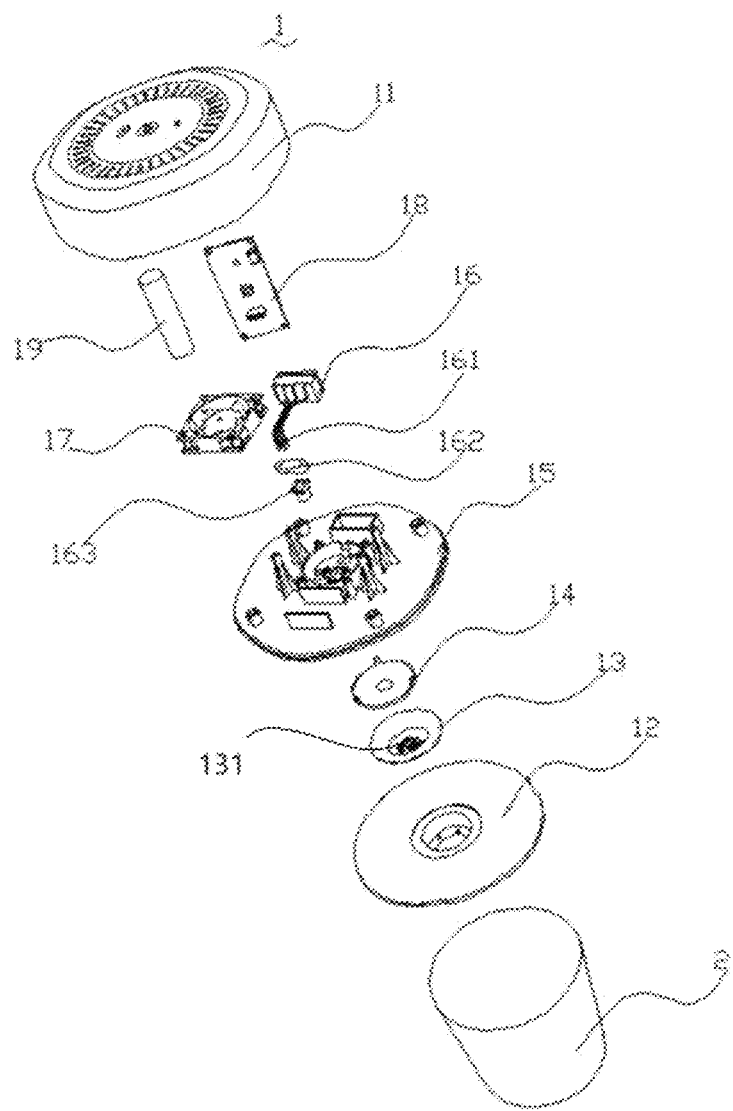
FIG. 3 is a schematic diagram of the explosion structure of a portable smoke injection device of the present application.
Figure 4:
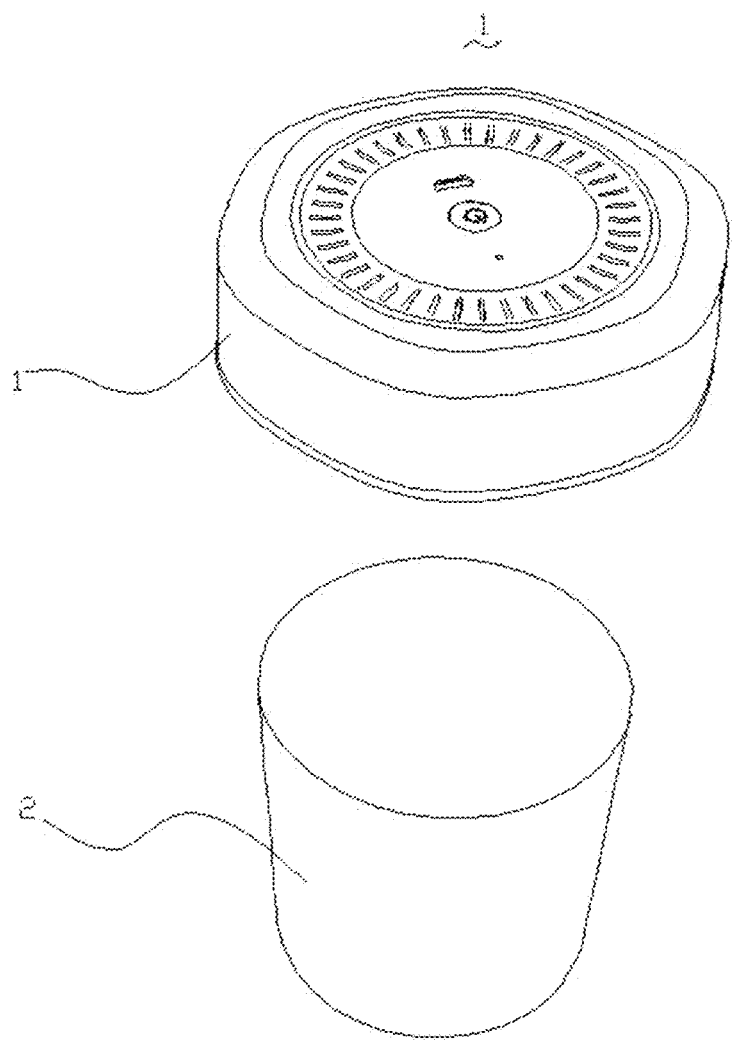
Figure 5:
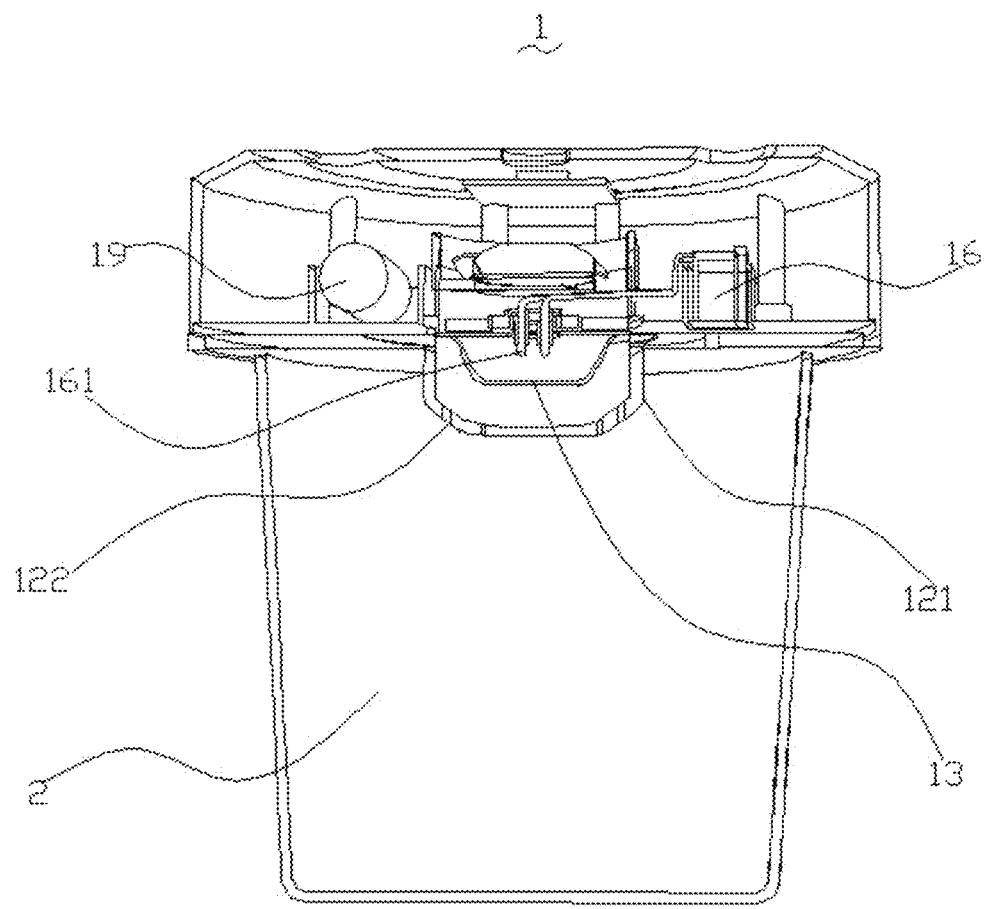
FIG. 5 is a schematic diagram of the cross-sectional structure of a portable smoke injection device of the present application.

As shown in FIGS. 1-5, the portable smoke injection device of the present application comprises a main body, a control circuit board 18 arranged inside the main body, an ignition module for igniting a burnt object, and a gas delivery module for outputting smoke from the main body.

A smoke outlet 122 for outputting smoke is provided at one end of the main body; an air inlet 112 is provided on the main body; a combustion chamber is provided inside the main body for placing the object to be burned; the smoke outlet 122 is provided outside the combustion chamber; the ignition module is close to or extends into the inside of the combustion chamber for igniting the object to be burned; a control button or control panel 111 is provided outside the main body for controlling the operation of the ignition module and the gas delivery module;

The ignition module, the gas delivery module, the control button and the control circuit board 18 are electrically connected.

The present application simultaneously sets a main body, a control circuit board 18 arranged inside the main body, an ignition module for igniting the object to be burned, and a gas delivery module for outputting smoke from the main body; a smoke outlet 122 for outputting smoke is provided at one end of the main body; an air inlet 112 is provided on the main body; a combustion chamber arranged inside the main body for placing the object to be burned; the smoke outlet 122 is provided outside the combustion chamber; the ignition module is close to or extends into the inside of the combustion chamber for igniting the object to be burned; a control button or control panel 111 is provided outside the main body for controlling the operation of the ignition module and the gas delivery module; the ignition module, the gas delivery module, the control button and the control circuit board 18 are electrically connected, and the combustibles are efficiently ignited by using related technologies such as arc high-voltage ignition, and the smoke is diffused by a fan to enter the wine glass, thereby giving the beverage a unique smoky flavor.

In some other embodiments, the main body includes a bottom cover 12 and an upper cover 11 matched with the bottom cover 12; the smoke outlet 122 is provided on the bottom cover 12; the air inlet 112 is provided on the upper cover 11.

A ceramic heat insulating member 13 for heat insulation is also provided inside the main body; the ceramic heat insulating member 13 matches the shape of the combustion chamber and is used to form the combustion chamber;

The ignition module is an arc high-voltage package 16, which uses high-voltage discharge to ignite the burnt material; the discharge part 161 of the arc high-voltage package 16 extends into the ceramic insulation part 13;

The discharge part 161 can be a high-voltage double arc electrode; it also includes an electrode insulation ceramic part 163 for insulation and a fixed plastic part 162 for fixing; It also includes an upper component insulation sheet 14 arranged at the ceramic insulation part 13;

The side of the ceramic insulation part 13 where smoke is discharged is densely provided with holes 131 for conducting and exhausting smoke.

The gas delivery module is a fan 17 or an air pump, which is not specifically limited in this application;

The main body is also provided with an installation panel 15 for fixing the control circuit board 18 and the fan 17.

A power supply assembly 19 is also provided inside the main body; a charging port 113 is provided outside the main body.

The middle part of the bottom cover 12 is recessed inward to form the combustion chamber; the smoke outlet 122 is provided around the outside of the combustion chamber. The component structure of the combustion chamber can be made of ceramic-coated metal material to provide a better heat insulation effect.

The air inlet 112 is provided around the front of the main body; the control button or control panel is located at the center of the air inlet 112 provided around.

The present invention introduces an integrated smoke injection device designed for automatic ignition using a high-voltage arc system. It also controls smoke diffusion in conjunction with a fan. This invention is relevant to the technical field of beverage flavor enhancement, particularly for smoking whiskey and other beverages. Specifically, the invention features a portable smoke injection device that effectively infuses smoke into a whiskey glass through a series of precise technical mechanisms.

The combustion chamber is surrounded by a ceramic insulating 13 and other internal structural components: specifically, an iron basin-shaped structure (ceramic-coated metal basin-shaped structure) can be used, and a smoke-exiting hole is provided at the bottom for placing wood chips and burning them.

Arc high-voltage package 16: It is isolated from the combustion chamber by heat-insulating materials such as ceramics, and uses high-voltage discharge technology to ignite wood chips. Other ignition structures with similar effects to the above arc high-voltage package 16 should be understood as equivalent technical solutions;

Circuit motherboard: Built-in control program, triggered by the power button, responsible for coordinating the work of the arc high-voltage package and the fan.

Fan 17: set inside the main body of the device, used to blow the smoke generated by combustion into the whiskey glass. Battery: Built-in in the device, providing power for each component and supporting charging function.

Shell: Integrate the above components into a portable structure; The specific working steps are as follows:
 1. The user puts an appropriate amount of wood chips into the combustion chamber.
 2. Press the power switch, and the circuit board starts the control program.
 3. The arc high-voltage package discharges to ignite the wood chips and produce smoke.
 4. The fan starts to diffuse the smoke into the beverage container.

The improvements of the present invention and the technical problems it solves are as follows:

Arc ignition: Instead of traditional open flames, high-voltage arcs are used to ignite wood chips, solving the safety hazards caused by open flames.

Fan control: The built-in fan accurately controls the injection amount and direction of smoke, avoiding the instability of natural airflow diffusion.

Portable design: The device is small in size and powered by a built-in battery, solving the problem of the existing equipment being unportable;

Simple operation: Just put in the wood chips and press a button to complete the operation, solving the defect of cumbersome manual operation.

The present invention directly brings the following beneficial effects through the above improvements:

Improved safety: arc ignition combined with ceramic heat insulation design avoids the use of open flames and significantly reduces the risk of fire.

Easy operation: one-button operation simplifies the smoking process, and users can complete it without complicated steps.

Precise smoke control: the fan controls the amount and direction of smoke injection to ensure the consistency of the smoking flavor each time.

Strong portability: the compact housing design and built-in battery make it easy to carry and suitable for home or outdoor use;

When using the present invention, the user only needs to follow the following steps: Put an appropriate amount of wood chips to be burned into the combustion chamber of the device.

Aim the smoke outlet at the bottom of the device at a beverage container such as a whiskey glass.

In the specific software setting part, you can press the power button, press and hold for 2 seconds to turn on the device, and then press the power button again. The device automatically starts: the arc high-voltage package 16 ignites the burnt material (such as wood chips) to produce smoke, and the fan 17 then spreads the smoke to beverage containers such as whiskey glasses.

After the smoke injection is completed, turn off the power, pour whiskey or other drinks into the glass and enjoy it. The whole process is simple and safe, suitable for daily use by home users;

Ignition method optimization: arc ignition technology can be replaced with plasma ignition or micro high-frequency induction heating to further improve ignition efficiency. Smoke diffusion method adjustment: the fan can be replaced with an air pump system to provide a more uniform smoke diffusion effect.

Combustion chamber material optimization: the combustion chamber can use ceramic-coated metal to improve high temperature resistance and reduce heat loss;

The technical effects of the technical problems solved by the present application are as follows:

Compared with the prior art, the portable smoke injection device 1 of the present invention is provided with a main body, a control circuit board 18 arranged inside the main body, an ignition module for igniting the object to be burned, and a gas delivery module for outputting smoke from the main body; a smoke outlet 122 for outputting smoke is provided at one end of the main body; an air inlet 112 is provided on the main body; a combustion chamber is provided inside the main body for placing the object to be burned; the smoke outlet 122 is provided outside the combustion chamber; the ignition module is close to or extends into the inside of the combustion chamber for igniting the object to be burned; a control button or control panel 111 is provided outside the main body for controlling the operation of the ignition module and the gas delivery module; the ignition module, the gas delivery module, and the control button are electrically connected to the control circuit board 18, and the combustibles are efficiently ignited by using related technologies such as arc high-voltage ignition, and the smoke is diffused by a fan to enter the wine glass, thereby giving the drink a unique smoky flavor.

What is claimed is:
1. A portable smoke injection device, comprising a main body, a control circuit board arranged inside the main body, an ignition module for igniting a burnt object, and a gas delivery module for outputting smoke from the main body;
  wherein the gas delivery module comprises a smoke outlet, the smoke outlet for outputting smoke is provided at one end of the main body; an air inlet is provided on the main body; a combustion chamber is provided inside the main body for placing the object to be burned; the smoke outlet is provided outside the combustion chamber; the ignition module is close to or extends into the combustion chamber for igniting the object to be burned;
  wherein the ignition module, the gas delivery module, the control button and the control circuit board are electrically connected-;
  wherein the main body comprises a bottom cover and an upper cover matched with the bottom cover; the smoke outlet is arranged on the bottom cover, and the air inlet is arranged on the upper cover;
  wherein the main body is also provided with a ceramic heat insulation member for heat insulation; the ceramic heat insulation member matches the shape of the combustion chamber.

2. The portable smoke injection device of claim 1, wherein the ignition module is an arc high-voltage package, which uses high-voltage discharge to ignite the object to be burned; the discharge part of the arc high-voltage package extends into the ceramic insulation part;
  wherein the ceramic heat insulating member is densely provided with holes for conducting the heat.

3. The portable smoke injection device of claim 1, wherein the gas delivery module is a fan or an air pump.

4. The portable smoke injection device of claim 3, wherein the main body is also provided with a mounting panel for fixing the control circuit board and the fan.

5. The portable smoke injection device of claim 1, wherein a power supply component is also arranged inside the main body; a charging hole is opened on the outside of the main body.

6. The portable smoke injection device of claim 1, wherein the middle part of the bottom cover is recessed inward to form the combustion chamber; the smoke outlet is arranged around the outside of the combustion chamber.

7. The portable smoke injection device of claim 1, wherein the combustion chamber is a ceramic-coated metal material structure.

8. The portable smoke injection device of claim 1, wherein the air inlet is arranged around the front of the main body.

* * * * *